R. M. PIERSON.
TIRE CALIPERS.
APPLICATION FILED DEC. 3, 1917.
1,394,347.  Patented Oct. 18, 1921.
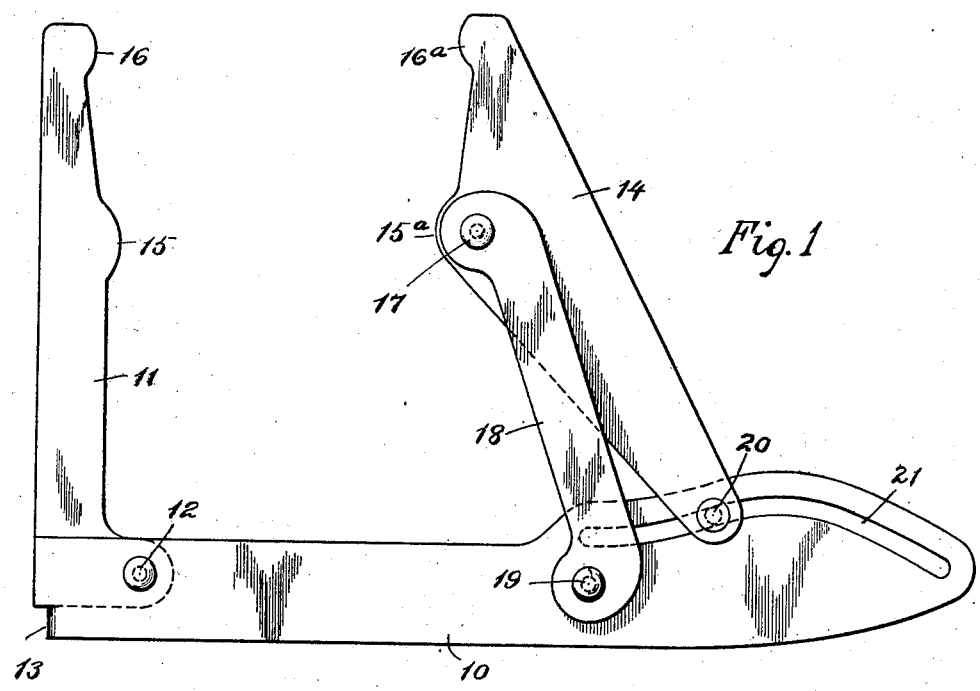
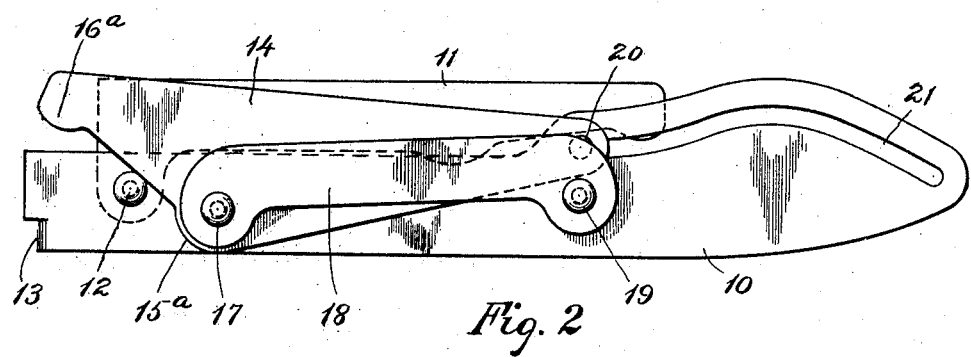
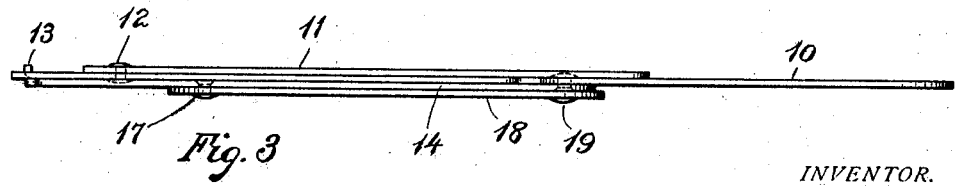
INVENTOR.
Robert M. Pierson

UNITED STATES PATENT OFFICE.

ROBERT M. PIERSON, OF AKRON, OHIO, ASSIGNOR TO THE B. F. GOODRICH COMPANY, OF NEW YORK, N. Y., A CORPORATION OF NEW YORK.

TIRE-CALIPERS.

1,394,347.      Specification of Letters Patent.      Patented Oct. 18, 1921.

Application filed December 3, 1917. Serial No. 205,064.

*To all whom it may concern:*

Be it known that I, ROBERT M. PIERSON, a citizen of the United States, residing at Akron, in the county of Summit and State of Ohio, have invented certain new and useful Improvements in Tire-Calipers, of which the following is a specification.

This invention relates to calipers and principally to those adapted to be used for comparing the normal transverse diameter or section of a pneumatic tire with its section at the point of greatest distortion under load, in order to determine whether the tire is sufficiently inflated, the instrument having measuring portions related by a predetermined percentage which represents the maximum safe amount of distortion. My invention is an improvement upon devices of the general type described in Gammeter's Patent No. 1,245,213 of November 6, 1917, and Curtis's Patent No. 1,281,526 of October 15, 1918, and its principal object is to enable the movable arm, especially in single-setting calipers of the Curtis variety, to be brought from its folded position to any one of its various operative positions in a single continuous movement and with a minimum of effort or tendency to bind.

Of the accompanying drawings,

Figure 1 is a side elevation of my improved calipers with the arms unfolded or opened out into their operative positions.

Fig. 2 is a similar view with the arms folded.

Fig. 3 is a top plan view with the arms folded.

In the drawings, 10 is an elongated flat plate or bar near one end of which is mounted the so-called fixed arm 11, which however is pivoted at 12 so that it may either extend at right-angles or fold parallel to the bar, there being a lip 13 bent laterally out of the plane of the bar so as to act as a stop for this arm in its operative position, as shown in Fig. 1.

14 is the movable arm. The two arms 11 and 14 are provided with two pairs of measuring points 15, 15$^a$ and 16, 16$^a$, as in the Curtis patent above referred to, the inner points 15, 15$^a$ being adapted to embrace or engage the opposite sides of the pneumatic tire and contact with its sides at a normal point away from the ground, and the outer pair of points 16, 16$^a$ being adapted to embrace and engage the tire at its point of maximum distortion under load, adjacent to the ground, the space between the outer pair of points exceeding that between the inner pair by a predetermined percentage (for example 9%), which represents the maximum safe amount of distortion as determined by experience. Provision is made for so guiding the arm 14 that this percentage will remain the same or be caused to vary in a desired manner in different positions of said arm corresponding to different sizes of tires. The improvement, which consists in providing the two pairs of measuring points and in thus guiding the movable arm, I do not claim broadly. Furthermore, it should be noted that the selected points on the arms between which the normal and distorted sections are measured may be marked in any suitable way, though it is preferred to provide projections at said points as shown.

The arm 14 is preferably mounted on the opposite side of the bar or support 10 from the arm 11, and is pivotally supported at 17 at an intermediate point in its length, adjacent to the inner measuring point 15$^a$, upon the free or outer end of a link 18 whose inner end is fulcrumed or pivoted at 19 on bar 10. In order to render the device compact the measuring portion 15$^a$ is placed close to the pivot 17 so that this portion describes a substantial circular path during a movement of the link 18 about its pivot 19. The inner end of arm 14 carries a pin or stud 20 which occupies a curved cam slot 21 formed in the bar 10, and the course of said slot is so laid that the resultant of the sliding motion of the stud 20 and the arcuate motion of pivot 17 about the pivot or fixed point 19 will be, in this case, to cause the measuring points 15$^a$, 16$^a$ to move in predetermined relative paths, and also to maintain a substantially constant percentage of difference in the spaces between the two pairs of measuring points 15, 15$^a$ and 16, 16$^a$ in all operative or tire-measuring positions of arm 14. Said positions are those at and to the right of the position approximately represented in Fig. 1, which may be taken as the one for the smallest section of tire within the range of the instrument. The paths traversed by the measuring points 15$^a$, 16$^a$ depend not only on the ratio between the distances 17—20 and 17—19, but also on the shape of the means such as the sidewalls of the slot 21 for guiding the stud 20, and their positions with reference to the pivot 19. The parts may be made to move with some friction at bearing points so as not to slip too easily.

The motion of arm 14 and link 18 to the left of the position shown in Fig. 1 causes the two to fold downwardly toward the bar 10 until they reach a position substantially parallel thereto, as indicated in Fig. 2, this latter view also showing the fixed arm 11 folded into a parallel position so that the instrument then occupies its smallest compass.

To unfold the calipers, the fixed arm 11 is turned at right-angles to the bar 10, and the movable arm 14 with its link 18 is swung upwardly by taking hold of either member (as for example grasping the back of arm 14 between thumb and forefinger) preferably somewhere in the general vicinity of the pivot 17, and pulling or pushing thereon until said members assume the position shown in Fig. 1 or some position to the right thereof. It results from this construction and arrangement of parts that the unfolding movement of arm 14 precedes and is continued by the positioning movement imparted thereto after said arm has reached its first operative position, and the combined or serial movement is applied with very little effort and without any substantial tendency to bind or cramp, such as is often experienced with tire calipers having a movable arm pivoted to a slide, especially when the user attempts to move the slide outwardly along the bar by pulling on some point of said arm at or near its outer end. The calipers are thus more easily worked and their operation more readily understood by the user.

To use the instrument, its inner pair of measuring points is applied to a normal section of the tire, away from the ground, and spaced apart by the width of the tire at that point; then, without changing this adjustment, the outer pair of points 16, 16ª is applied to the point of maximum distortion adjacent to the ground. If this distorted section exactly fits or is less than the space between said outer points, the tire is sufficiently inflated for the particular load which it bears, but if it exceeds the width of said space, the tire is too soft and should be further inflated.

While the foregoing structure embodies my invention in a preferred form, such form may be variously modified within the scope of the claims.

I claim:

1. The pneumatic tire calipers having measuring portions representing respectively the normal transverse diameter and the predetermined safe distorted diameter for any one of a number of sizes of tires, a bar, a pair of arms thereon adapted to embrace the tire between them, one of said arms being mounted to extend transversely or fold longitudinally of the bar, and means for guiding said arm in a single continuous movement from its folded position into its several operative tire-measuring positions.

2. In pneumatic tire calipers having measuring portions representing respectively the normal transverse diameter and the predetermined safe distorted diameter for any one of a number of sizes of tires, a bar, a pair of arms thereon adapted to embrace the tire between them, one of said arms being mounted to extend transversely or fold longitudinally of the bar, and means for guiding said arm in a single, continuous, combined pivotal and sliding movement from its folded position into its several operative tire-measuring positions.

3. In pneumatic tire calipers, the combination of a support, a pair of arms thereon, each having one point of each of two pairs of measuring points whose distances apart between the arms, in various relative positions of said arms, differ by predetermined amounts representing the maximum safe amounts of distortion for the corresponding sizes of tires, and means for guiding one of said arms in a single, continuous, combined pivotal and sliding movement relatively to the other arm, from its inoperative position to its various tire-measuring positions.

4. In pneumatic tire calipers, the combination of a bar, a pair of arms mounted thereon and relatively movable to open and close the calipers, a link pivoted respectively to said bar and one of said arms, and means for so guiding another point on said arm that the arm may be forced in a continuous movement from closed to various open positions and that two pairs of selected arm points will differ in their distances apart between the arms by a predetermined percentage which remains substantially constant in the several relative open positions of the arms.

5. In pneumatic tire calipers, the combination of a bar, a pair of measuring arms mounted thereon, a link pivotally connected to said bar and to a point on one of said arms which is guided by the link in a circular arc, and means for guiding another point of said arm slidingly in a predetermined path along the bar, such that said arm is movable continuously from a folded position substantially parallel to the bar into various operative positions transverse thereto.

6. In pneumatic tire inflation-testing calipers, the combination of a bar having a slot, a pair of measuring arms respectively pivoted on opposite sides of said bar, a link pivoted to said bar and to a point on one of said arms which is guided by the link in a circular arc, said link and the arm to which it is pivoted being on the same side of the bar, and a stud at another fixed point on said arm occupying said slot.

7. In pneumatic tire calipers, the combination of a bar, a pair of measuring arms mounted thereon and each having one point of each of outer and inner pairs of measuring points, the points of the outer pair being operatively further apart than those of the inner pair, a link pivoted at its inner end to the bar and at its outer end to a point on one of said arms adjacent to the inner one of the latter's measuring points, the bar having a longitudinal curved slot terminating at one end laterally adjacent to the inner pivot of said link, and a stud on the inner end of said arm, occupying said slot.

In testimony whereof I have hereunto set my hand this 1st day of December, 1917.

ROBERT M. PIERSON.